(12) United States Patent
Mahindra et al.

(10) Patent No.: US 10,021,172 B2
(45) Date of Patent: Jul. 10, 2018

(54) SOFTWARE DRIVEN LONG-TERM-EVOLUTION CORE NETWORK FOR MOBILE ACCESS

(71) Applicant: NEC Laboratories America, Inc., Princeton, NJ (US)

(72) Inventors: Rajesh Mahindra, Princeton, NJ (US); Karthikeyan Sundaresan, Manalapan, NJ (US); Arijit Banerjee, Durham, NC (US); Sampath Rangarajan, Bridgewater, NJ (US)

(73) Assignee: NEC Corporation (JP)

( * ) Notice: Subject to any disclaimer, the term of this patent is extended or adjusted under 35 U.S.C. 154(b) by 98 days.

(21) Appl. No.: 15/274,496

(22) Filed: Sep. 23, 2016

(65) Prior Publication Data
US 2017/0085628 A1 Mar. 23, 2017

Related U.S. Application Data

(60) Provisional application No. 62/222,711, filed on Sep. 23, 2015.

(51) Int. Cl.
*H04L 29/08* (2006.01)
*H04L 12/24* (2006.01)
*H04L 12/727* (2013.01)
*H04L 12/715* (2013.01)

(52) U.S. Cl.
CPC .......... *H04L 67/10* (2013.01); *H04L 41/5025* (2013.01); *H04L 67/16* (2013.01); *H04L 41/5054* (2013.01); *H04L 41/5087* (2013.01); *H04L 45/121* (2013.01); *H04L 45/64* (2013.01)

(58) Field of Classification Search
CPC ............................ H04L 41/5025; H04L 67/16
USPC ...... 709/223, 224, 226, 229, 246; 718/1, 104
See application file for complete search history.

(56) References Cited

U.S. PATENT DOCUMENTS 9,692,696 B2* 6/2017 DeCusatis ............... H04L 45/72
2014/0068602 A1* 3/2014 Gember .............. G06F 9/45558
718/1

OTHER PUBLICATIONS

"Data Center Middleboxes"—Hakim Weatherspoon, Cornell University, Dept. of Computer Science, Nov. 23, 2014 https://www.cs.cornell.edu/courses/cs5413/2014fa/lectures/26-datacenter-middleboxes.pdf.*
Hong et al., "Achieving High Utilization with Software-Driven WAN",SIGCOMM13, Aug. 2013, pp. 15-26.

* cited by examiner

*Primary Examiner* — Randy Scott
(74) *Attorney, Agent, or Firm* — Joseph Kolodka

(57) ABSTRACT

Systems and methods for managing network resources, including managing a generated virtualized data plane network using a central controller. Virtual machine (VM) resources are assigned to two or more different network functions at a local data center. Traffic is dynamically optimized based on at least one of aggregate traffic demands and quality of service (QoS) goals, and resource allocations and inter-data center (DC) bandwidth resources are determined for VMs for a plurality of services. VMs for each middlebox function and a routing plane for each service are configured based on the determined resource allocation, and flows are routed based on the resource allocation and one or more configured network paths using an overlay-routing framework.

9 Claims, 9 Drawing Sheets

SOFTWARE DRIVEN LONG-TERM-EVOLUTION CORE NETWORK FOR MOBILE ACCESS

RELATED APPLICATION INFORMATION

This application claims priority to provisional application No. 62/222,711 filed Sep. 23, 2015, the contents of which is incorporated herein by reference.

BACKGROUND

Technical Field

The present invention relates generally to computer networking and data traffic management, and more particularly, to a virtualized data plane framework for centrally manage network resources across geographically distributed data centers.

Description of the Related Art

Growing demand for data and the increasing number of devices are drastically changing the scale of operation in Long-Term-Evolution (LTE) networks. With emergence of newer business models, services require more efficient provisioning with enhanced traffic management. Current LTE Core Network implementations are inflexible and inefficient to meet these requirements.

The rise of cloud computing has caused, and will continue to cause data traffic per smartphone to grow exponentially in the coming years (e.g., forecasted to 5 GB, with 25 billion connected devices by 2020). The coupled effect of the growth of devices and the data will require networks to operate at scale. Additionally, a saturated voice market and limited long-term growth from data access requires mobile operators to expand to newer business models, such as Internet of Things (IoT) based services, enterprise mobility, and vertical MVNOs. However, to enable such network-as-a-service business models, operators need additional capabilities for rapid provisioning of network resources of both the radio access and the core network. In the context of LTE core networks, current specialized hardware based deployments are not capable of efficiently and cost-effectively meeting these requirements.

Motivated by IT Clouds, (e.g., EC2) that can provide high reliability at lower costs, operators are considering Network Functional Virtualization (NFV) as a primary candidate for the first step towards evolving their networks. With virtualization, the network functions may be deployed over a platform based on commercially available hardware, enabling fast and agile provisioning. While operators do realize the benefits of NFV, its adoption in the core networks has been hindered due to the presence of several technical challenges. One of the primary challenge is the need to design a management layer that is tailored to the future requirements of LTE networks. Without efficient management, the network capacity may not be matched to the real-time traffic demands, leading to lower resource utilization and degraded traffic Quality of Service (QoS).

SUMMARY

A computer implemented method for managing network resources, including managing a generated virtualized data plane network using a central controller. Virtual machine (VM) resources are assigned to two or more different network functions at a local data center. Traffic is dynamically optimized based on at least one of aggregate traffic demands and quality of service (QoS) goals, and resource allocations and inter-data center (DC) bandwidth resources are determined for VMs for a plurality of services. VMs for each middlebox function and a routing plane for each service are configured based on the determined r source allocation, and flows are routed based on the resource allocation and one or more configured network paths using an overlay-routing framework A system for managing network resources, including a central controller for managing a generated virtualized data plane network. The controller is configured to assign virtual machine (VM) resources to two or more different network functions at a local data center, dynamically optimize traffic based on at least one of aggregate traffic demands and quality of service (QoS) goals, and determine resource allocations and inter-data center (DC) bandwidth resources for VMs for a plurality of services. A network path configuration device configures VMs for each middlebox function and a routing plane for each service based on the determined resource allocation, and a networking device routes flows based on the resource allocation and one or more configured network paths using an overlay-routing framework.

A computer-readable storage medium including a computer-readable program for managing network resources by managing a generated virtualized data plane network using a central controller. Virtual machine (VM) resources are assigned to two or more different network functions at a local data center. Traffic is dynamically optimized based on at least one of aggregate traffic demands and quality of service (QoS) goals, and resource allocations and inter-data center (DC) bandwidth resources are determined for VMs for a plurality of services. VMs for each middlebox function and a routing plane for each service are configured based on the determined resource allocation, and flows are routed based on the resource allocation and one or more configured network paths using an overlay-routing framework.

These and other advantages of the invention will be apparent to those of ordinary skill in the art by reference to the following detailed description and the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
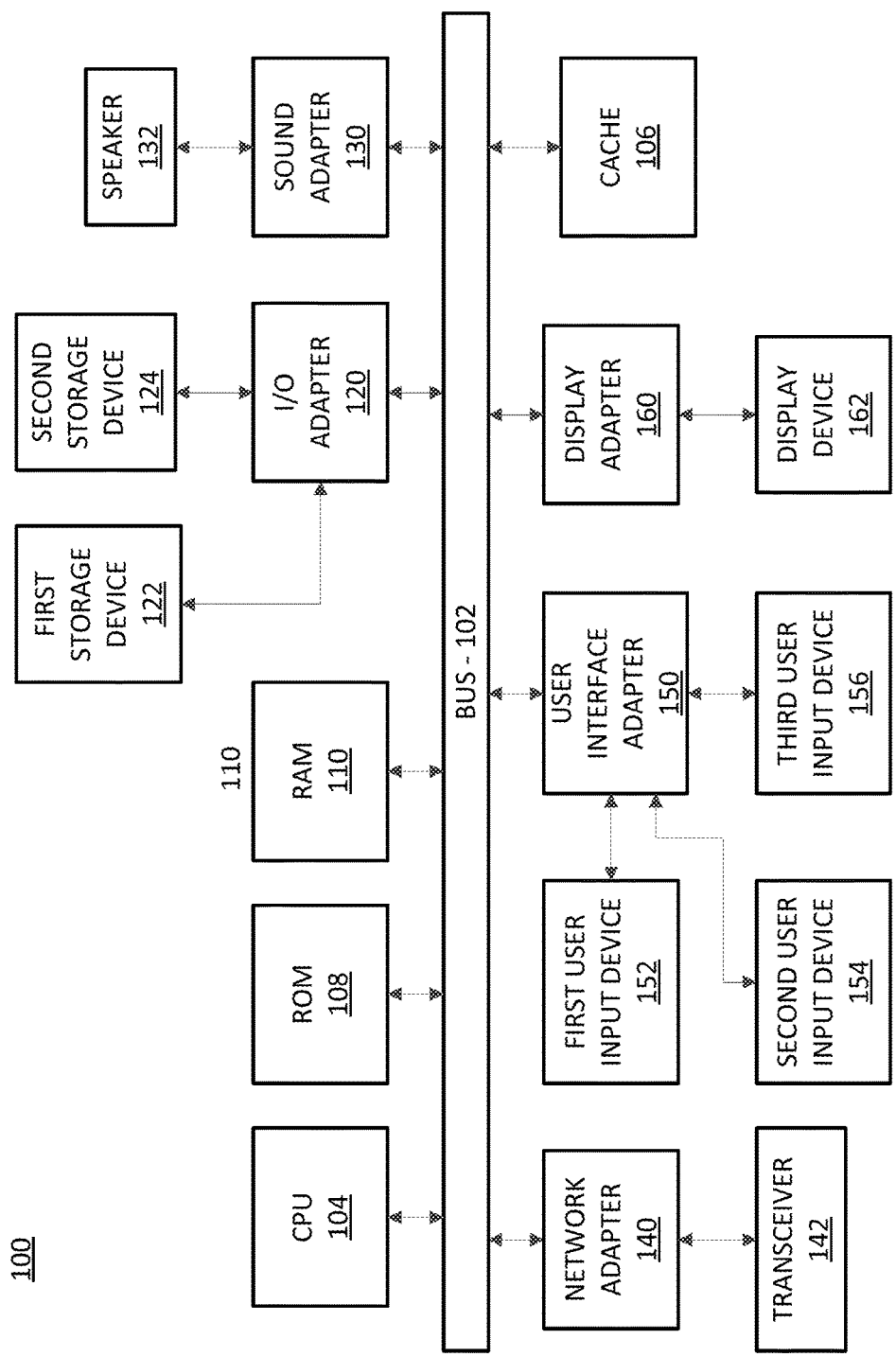
FIG. 1 is a block/flow diagram illustrating an exemplary processing system to which the present principles may be applied, in accordance with the present principles.

In accordance with various embodiments of the present principles, systems and methods are provided for data traffic/network resource management across multiple mote data centers using a central controller. In up particularly useful embodiments, the present principles may be employed to efficiently implement Network Function Virtualization (NFV) for management of multiple remote data centers.

Although a complete re-design of a network to overcome protocol inefficiencies and support the ever-growing demand for data transport is one possible direction, this is cost-prohibitive. In some embodiments, the present principles may be employed to support future data requirements by expanding on two trends: (i) virtualization of networks with the adoption of NFV; and (ii) the growing popularity of cloud computing has led to advances in both SDN and distributed systems. The present principles may be employed to effectively combine these trends for data traffic management by solving several challenges specific to Long-Term-Evolution (LTE) networks. Using central resource allocation, the present principles may be employed to effectively manage compute resources across multiple data-centers in a way to meet the traffic requirements. With full compliance to 3GPP based protocols, the system and method according to the present principles ensures faster, incremental and more cost-effective deployments than conventional systems and methods in accordance with various embodiments.

In one embodiment, to efficiently implement NFV deployments, the present principles may be employed by applying key principles from Software Defined Networking (SDN) and distributed systems, intelligently adapting to the needs and constraints of a virtualized LTE core network. The system and method according to the present principles efficiently manages the compute and net work resources across services, while providing primitives for operators to perform policy-driven traffic management.

In some embodiments, two key features of the system and method according to the present principles include: (i) centralized allocation of resources of a group of data-centers (DCs); and (ii) enforcement of the central allocation on the data-plane. Resources may be effectively allocated at the granularity of services, striving to meet the traffic requirements for a plurality of types of services (e.g., services that carry delay-sensitive traffic, services that carry elastic traffic, etc.). Based on current traffic demand and resource availability, compute resources may be allocated to each service across the network (e.g., allocating all the resources in the same DC or splitting the allocation across DCs.) Dynamic management of resources at multiple DCs reduces provisioning costs. Additionally, the data-plane for each service, including both the standardized LTE gateways and middleboxes, may be configured according to the present principles to enforce its allocation.

In some embodiments, the flows belonging to different services may require processing from different sets of middleboxes in the core network. Overlay routing on the data-plane may be performed to ensure that the traffic of each service is routed across the appropriate middleboxes at the DCs (e.g., according to the allocation computed for that service). To ensure a practical design for the data-plane, compute resources may be assigned to all the flows belonging to a service along the same path (e.g., the same DCs). However, to achieve such an allocation, the resulting formulation for the centralized allocation algorithm may include two conflicting constraints, and therefore may become computationally complex and processor intensive. While the allocation algorithm could be relaxed to allow arbitrary routing of flows within a service in theory, the resulting allocations are difficult to enforce in practice.

Additionally, unlike regular middleboxes that employ IP routing, the standardized LTE gateways employ 3GPP-defined standard IP-tunnels to routes user traffic across the gateways. Moreover, the users are statically assigned to the gateways, making it challenging to dynamically enforce the allocation or services across the data-plane. Thus, to ensure that the system and method according to the present principles are deployable in current (and future) LTE networks, the present principles may be employed to effectively account for well-defined standard interfaces and protocols, and the persistent sessions of the LTE gateways in accordance with various embodiments.

In some embodiments, the present principles may be employed to systematically overcome the afore-mentioned challenges with several important contributions and features. Firstly, LTE-gateways may be re-architected by splitting the control and forwarding planes and instrumenting consistent hashing to re-distributing the state of devices across the gateways. These mechanisms enable efficient scaling of the LTE gateway resources and offloading of selective services across DCs. The implementation provides sufficient primitives for the controller to enforce resource allocations across the data-plane, including the LTE-gateways, in accordance with the present principles.

Secondly, to ensure a simple design for the data-plane routing, the present principles may be employed to allocate resources for delay-sensitive services differently from the elastic services. For example, an efficient greedy algorithm for allocating resources to the delay-sensitive services across the DCs may be employed to minimize their delays while meeting their traffic demand. For elastic services, a lightweight algorithm to effectively consume the unutilized resources left by the delay-sensitive services may be formulated and applied in accordance with the present principles. The allocations may be performed in a manner to ensure a simple design for the data-plane routing.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapt 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 cat be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 100, 200, 300, 400, 500, 600, 700, and 900, described with respect to FIGS. 1, 2, 3, 4, 5A, 6, 7, and 9, respectively, are systems for implementing respective embodiments of the present principles. Part or all of processing system 100 may be implemented in one or more of the elements of systems 200, 300, 400, 500, 600, 700, and 900, according to various embodiments of the preset t principles.

Further, it is to be appreciated that processing system 100 may perform at least part of the method described herein including, for example, at least part of methods 200, 300, 400, 500, 600, 700, and 800, described with respect to FIGS. 1, 2, 3, 4, 5A, 6, 7, and 8. Similarly, part or all of systems 200, 300, 400, 500, 600, 700, and 800 may be used to perform at least part of methods 200, 300, 400, 500, 600, 700, and 800 according to various embodiments of the present principles.

Figure 2:
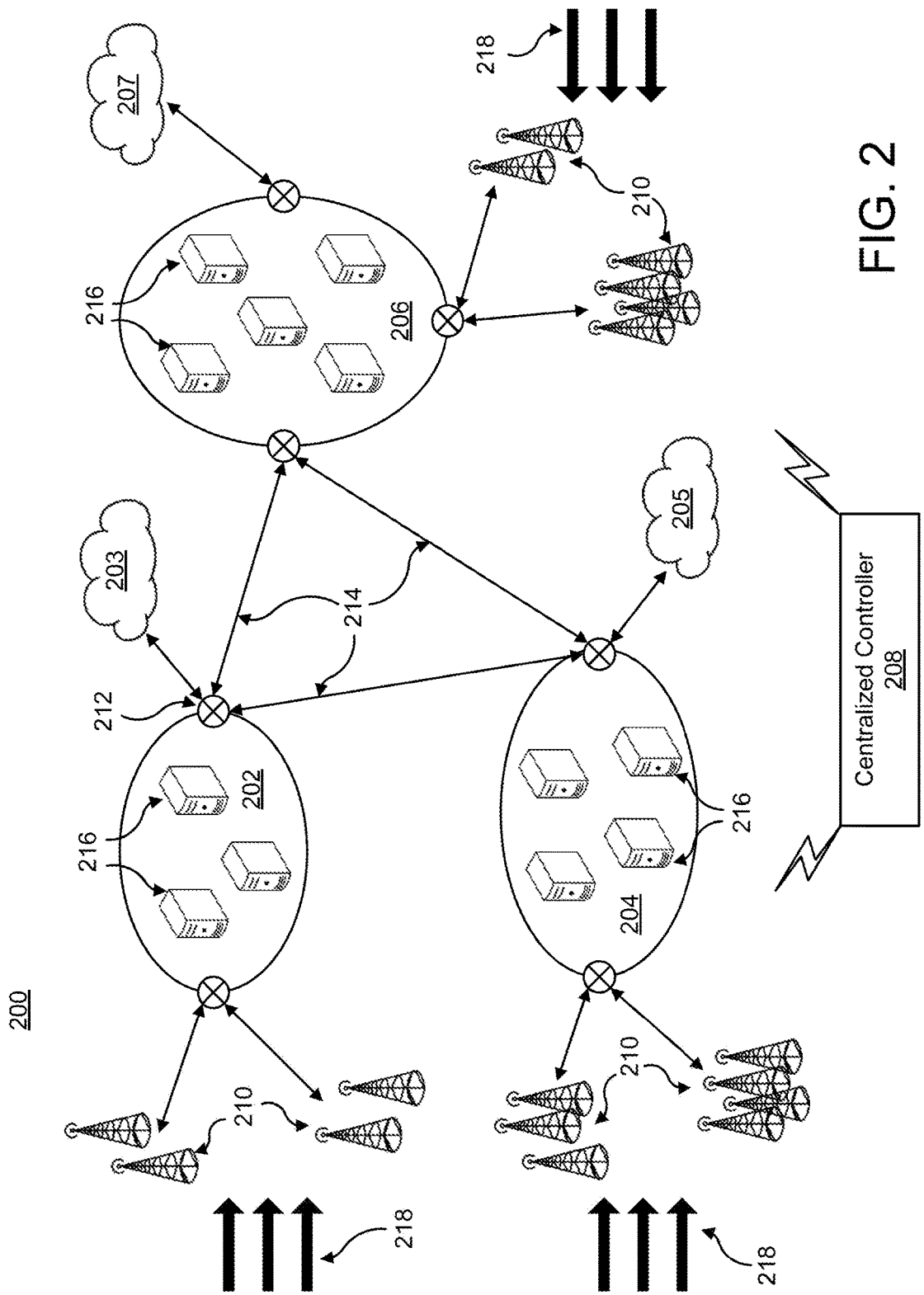
FIG. 2 shows a high-level diagram of a system/method for data traffic/network resource management for remote data centers, in accordance with an embodiment of the present principles.

Referring now to FIG. 2, a high-level diagram of a system/method 200 for data traffic/network resource management for remote data centers (DCs) is illustratively depicted in accordance with the present principles. Before describing various embodiments of the system and method according to the present principles in detail, some background on network architecture is provided herein below for ease of illustration.

In one embodiment, an LTE network may include a Radio Access Network (RAN) and an Evolved Packet Core (EPC). The RAN may include Evolved Node Bs (eNodeBs), or basestations (BSs) that serve the user devices (UEs), and the EPC may include both control-plane entities (that manage the devices) and data-plane entities (that route the data traffic). While a main control-plane element may be a MME (Mobility Management Entity), the data-plane functions may also comprise both standardized LTE-gateways and generic middleboxes in accordance with various embodiments of the present principles. In some embodiments, SGW and PDN-GW may be included in the EPC.

In one embodiment, LTE Gateways may be employed for data transport. In accordance with the present principles, packets from the eNodeB may be routed through two gateways (e.g., the Serving Gateway (SGW) and the Packet Data Network Gateway (PDN-GW). A primary function of the SGWs is to maintain the data path as User Equipment/Devices (UE) moves across a set of eNodeBs. The PDN-GW may be the internet gateway, and it may be employed to assign an IP address to the UE and to route its data traffic to and from the external networks. Additionally, the SGW and PDN-GW are responsible for enforcing operator-defined policies (e.g., Quality of Service (QoS)), performing packet filtering, and gathering accounting information in accordance with various embodiments of the present principles.

The data traffic of each UE may be carried over a bearer, which may be a logical transport channel between the UE and the PDN-GW. Each bearer may be associated with a QoS profile that describes the properties of the transport channel (e.g., desired bit-rate, delay, etc.). A UE may have multiple bearers at a given time, with traffic from different applications carried over separate bearers, depending upon QoS requirements. A particular bearer of a UE may include, for example, the following three segments: (i) radio bearer and data bearers (ii) between eNodeB and SGW and (iii) between SGW and PDN-GW in accordance with various embodiments. Within the core network, the user traffic belonging to a data bearer may be carried over a tunnel using, for example, the General Packet Radio Service (GPRS) Tunneling Protocol-User Plane (GTP-U) encapsulation headers in accordance with the present principles.

Typical middleboxes only hold state for active flows or connections. The flow state includes both policy data and run-time data that is created and maintained as the packets of the flow are received. However, the SGW and PDN-GW may persistently hold state for a UE. Once a UE registers with the network, the protocols are designed to ensure that the UE is managed by the same SGW and PDN-GW as the UE cycles between Idle and Active modes. Specifically, when a UE initially registers, a Mobility Management Entity (MME) may assign a SGW and PDN-GW to the UE and the appropriate bearer(s) may be created for the UE.

In some embodiments, a corresponding state for the UE may be created at the SGW and PDN-GW. The state mainly includes information about the bearer(s), such as the tunnel identifier, eNodeB/SGW/PDN-GW IP address and the associated QoS profile, packet filter, accounting information, etc. for each bearer. After a few seconds of inactivity, a UE may transition from Active to Idle mode and only the radio bearer(s) and data bearer(s) between the eNodeB and the SGW may be destroyed. Other state information relating to the bearer(s) between the SGW and PDN-GW may be maintained. When the UE moves back to Active mode, the bearers may be created (re-created) between the current eNodeB and the previously assigned SGW. Hence, the traffic flows of a UE may always be routed through the same SGW and PDN-GW, unless the UE moves to an eNodeB that is served by a different pool of SGWs and PDN-GWs in accordance with the present principles. In some embodiments, SGW and PDN-GW may belong to n Evolved packet Core (EPC), which may correspond to the core network for LTE.

In some embodiments, in addition to the LTE-gateways, the LTE core network may also include several other network functions (middlebox functions). These middleboxes may be deployed behind the PDN-GW and either provide value adds to customers or are essential for network operations: (i) User network and privacy protection (Firewalls), (ii) QoE enhancement (e.g., HTTP-proxies), (iii) Enhanced network functionality for enterprise customers (e.g., VPN) (iv) Value-adds (e.g., Parental Controls). Unlike the SGW/PDN-GW that leverage 3GPP based standardized GTP-U tunnels, operators are free to deploy custom protocols that route the IP traffic flows across the middleboxes. Since not all flows will require service from the same set of middleboxes, routing may be performed to ensure that the flows are sent to the appropriate middleboxes in the correct order.

A Service Chain refers to an ordered set of middlebox functions offered to a common set of flows, and there may be one or more service chains for each UE. In accordance with various embodiments, service chains for a particular flow may include, for example, a video transcoder and a firewall, while the service chain for a different flow may include, for example, a parental controller, a video transcoder and an intrusion detection service in accordance with the present principles.

In some embodiments, the present principles may employ NFV to effectively support increasing data, and network resource demands, and may comprise several important design components, (i) data-plane management to effectively manage the virtual compute resources, (ii) data-plane routing to set-up the routes of the traffic flows across the VMs of appropriate functions, and (iii) data-plane optimizations to ensure efficient packet-processing in software on VMs in accordance with the present principles. While there have been several research and industrial efforts to focus on the addressing the technical challenges with the data-plane optimizations, the present principles focus is on the data-plane management and routing. The latter two have also received attention, especially in industrial standards, such as ETSI NFV Management and IETF service chain routing.

However, these efforts are focused at basic operations, such as VM creation, monitoring and label-based service-chain routing, and are not capable of considering specific constraints of LTE networks. Furthermore, the two efforts have been independent of each other, limiting the ability of the data-plane management. The system and method according to the present principles enhances the capabilities of the data-plane management to meet future requirements (e.g., exponential increase in data traffic/network resource demands) for LTE. In doing so, the present system and method intelligently bridges the gap between data-plane management and routing to enable a unified solution that is readily deployable using commercially available equipment.

In one embodiment, data-plane management may be performed by adopting Software Defined Network (SDN) paradigms, and employing a centralized controller 208 for effective management of compute resources at a network-wide scale. The present principles may be employed to exploit key features of the NFV paradigm, including, for example, (i) geo-multiplexing, and (ii) traffic management. With respect to geo-multiplexing, despite operators having geographically distributed DCs and presence-points (PoPs), current hardware-based deployments are highly localized, with each DC managing the traffic from eNodeBs spread across a large area. Due to their rigidity, the hardware middleboxes are statically placed and hard-wired at DCs, with little or no ability to share load across the DCs in real-time. Additionally, most operators have a hierarchical deployment with the distributed SGWs but centralized PDN-GWs to reduce pro-visioning costs. Such deployments lead to inflated delays since all the traffic has to be routed through the centralized PDN-GWs.

However, by implementing NFV in accordance with the present principles, there is an operators may distribute the gateway functionalities across DCs to both increase availability and decrease delays by dynamically multiplex compute resources across geographically rewrote DCs. Otherwise, operators would either need to provision a DC for the worst case traffic requirement from the eNodeBs serviced by that DC, thereby increasing costs or service a large area of eNodeBs at a single DC, and inflating delays. Thus, the central controller 208 may assign virtual machine (VM) resources to a plurality of different network functions across the DCs (depending upon current traffic load conditions). This ensures that selective flows from DCs are routed and egressed through less loaded DCs in accordance with the present principles.

With respect to traffic management, it is traditionally difficult for operators to intelligently manage the traffic flows across their networks for several reasons. Firstly, the LTE-gateways and the middleboxes are typically executed over separate hardware platforms with independent management layers, designed by different vendors. Although the LTE-gateways do provide primitives for QoS (e.g., bearers), the QoS enforcement within the core network is conventionally limited to per-flow rate limiting. Secondly, the inflexibility with dynamic resource provisioning has resulted in operators relying on creating and managing separate, isolated and over-provisioned sub-networks for customers that need guaranteed QoS (e.g., enterprise customers).

In one embodiment, with virtualized deployments, all the core network functions, including both the LTE-gateways and other middleboxes may be executed over a common hardware platform. Hence, similar to IT clouds that leverage management frameworks (e.g., OpenStack), the present principles may be employed for network management using a single, unified management plane (e.g., including a central controller 208) for the core network. In some embodiments, the system and method according to the present principles may multiplex traffic from different services over the same set of compute resources, while optimizing the end-to-end traffic for individual services across the core network. By taking into account the aggregate traffic demands and QoS requirements for each service, the controller 208 may perform dynamic optimization of both managed and over-the-top (OTT) traffic to ensure more concrete SLAs with the customers and effective network management in accordance with the present principles.

In some embodiments, data-plane routing may be performed to ensure the management plane is effective in enforcing computed allocations. Individual middlebox functions on the data-plane may be configured to (i) scale the number of VMs, and (ii) dynamically change the routes for traffic flows in accordance with the present principles. To ensure that VM assignments and the routing for the end-to-end data-plane is configurable, both the LTE-gateways and other middlebox functions may be considered. However, unlike the other middleboxes, conventional LTE-gateway implementations are ill-suited to meet these requirements. In addition to adhering to 3GPP based functions and protocols, a fundamental problem is that the LTE-gateway implementations also strictly adhere to 3GPP based resource management schemes to manage the compute resources.

Their implementations were designed based on a few archaic assumptions, such as over-provisioned systems with infrequent capacity expansions and limited number of devices. As a result, the current implementations cannot be easily configured to (i) change the number of active VMs, while distributing the flows across the active VMs, and/or (ii) re-assign traffic flows to VMs placed at other DCs. Specifically, a main problem with conventional systems and methods is that UEs are persistently assigned to a SGW and a PDN-GW by the MMEs for long periods of time. Although, it is possible to dynamically transfer or re-assign UE to another gateway, the conventional procedure is not scalable since it generates significant control messages per UE (e.g., including messages over the wireless link). Hence, simply porting the current gateway implementations will greatly restrict the ability of the controller, requiring a fixed allocation of SGWs/PDN-GWs at the closest DC for every flow, which is cost-prohibitive.

In one embodiment, the system and method 200 is configured to support resource and data intensive network deployments (e.g., future network deployments) with a plurality of DCs 202, 204, 206 in accordance with the present principles. Each of a plurality of eNodeBs 210 may be directly connected to the closest DC 202, 204, 206 in physical proximity, which may be referred to as the local DC 202, 204, 206 for a particular eNodeB 210. To achieve improved network utilization and traffic QoS, the system 200 may employ a centralized controller 208, which t ay include a global view of the traffic demands 218 and network topology.

In some embodiments, the central controller 208 may periodically assign both the compute (e.g., VM) resources and the inter-DC bandwidth resources across traffic flows 214. The basic unit of compute resource allocated by the system 200 is a VM. Each DC 202, 204, 206 may be assumed to have a fixed number of physical servers 216, which may be provisioned based on, for example, the long-term average traffic statistics. Hence, a DC 202, 204, 206 can host a given number of VMs (not shown); such that each VM is allocated the same amount of CPU and memory in accordance with the present principles.

In some embodiments, each DC 202, 204, 206 may be interconnected with other neighboring DCs using, for example, either leased or dedicated links 214. In some embodiments, there may be multiple links between a given pair of DCs 202, 204, 206, but these links may be treated as a single logical link with capacity equal to the aggregate capacity of the individual links in accordance with the present principles. Data traffic may also be routed through a local egress 203 to/from a DC 202, 204, 206 to an Internet Service Provider 203 (ISP) in accordance with the present principles. While the above network configuration is depicted for ease of illustration, it is to be appreciated that the present principles may be applied to other network configurations and network sizes in accordance with various embodiments.

Figure 3:
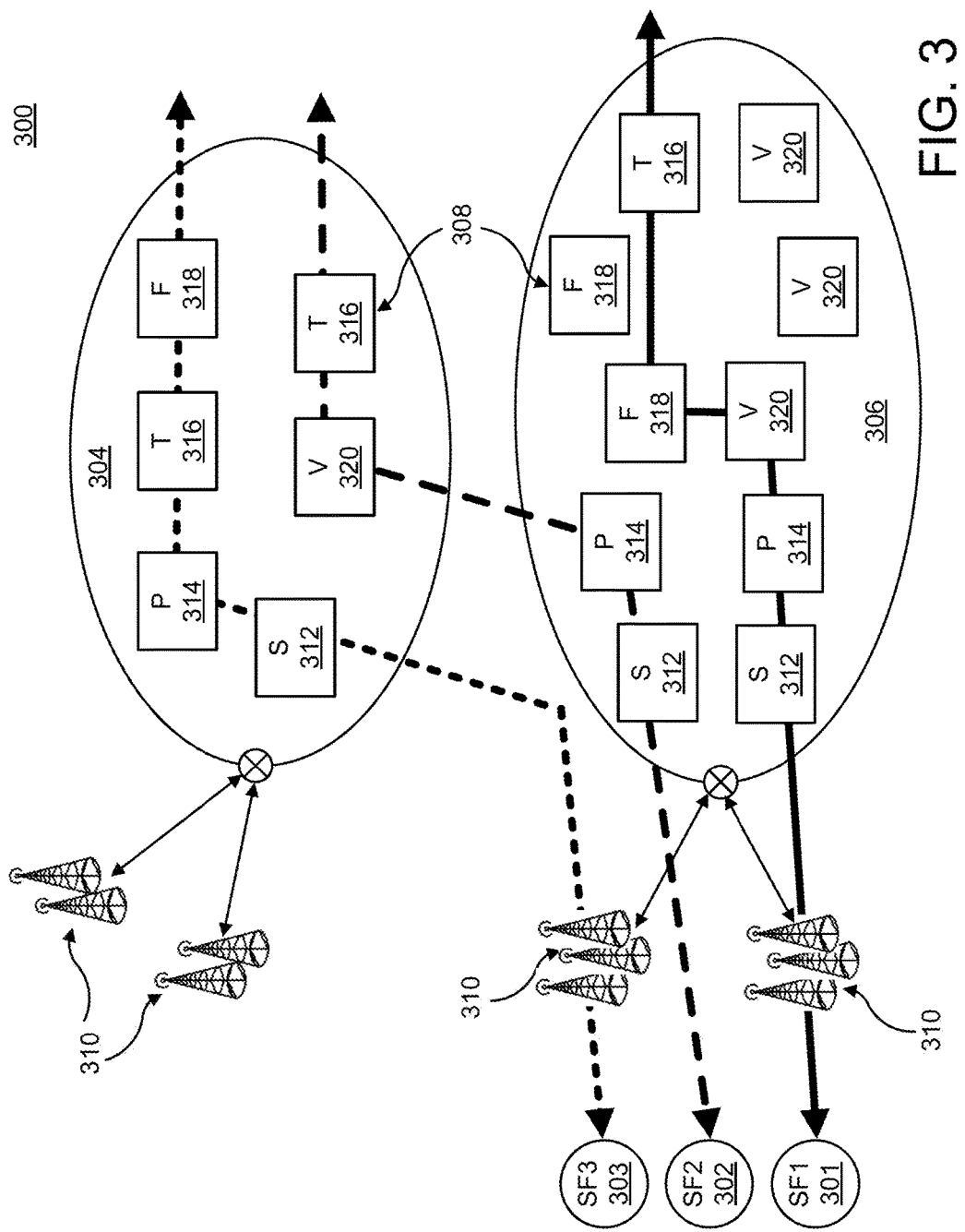
FIG. 3 is a block/flow diagram illustrating an exemplary service flow allocation during data traffic/network resource management, in accordance with an embodiment of the present principles.

Referring now to FIG. 3, a block/flow diagram of an exemplary service flow allocation 300 for data traffic/network resource management is illustratively depicted in accordance with an embodiment of the present principles. In one embodiment, network traffic may be represented in the units of a service flow 301, 302, 303. A service flow may include a group of flows of a particular service with the same: (i) QoS traffic type and (ii) Service chain in accordance with the present principles. Driven by typical mobile application traffic characteristics, the system and method according to the present principles may support, for example, 2 traffic types: (e.g., Interactive and Elastic) in accordance with various embodiments.

In one embodiments, since interactive flows may be delay-sensitive, the present principles may be employed to minimize their end-to-end delays, while meeting their traffic demand. In the case of elastic flows, the present principles may be employed to maximize the aggregate throughput while fairly allocating resources. A moving average of the traffic demand may be tracked and saved for each of a plurality of service flows 301, 302, 303, and may originate from one or more eNodeBs 310 at each or a plurality of DCs 304, 306. While satisfying the requirements of the service flows 301, 302, 303, a subset of service flows that originate from the eNodeBs 310 connected to their local DCs 304, 306, may be egressed through a neighboring or remote DC 304, 306 in accordance with the present principles.

In various embodiments, these service flows 301, 302, 303 may be either partially or fully processed at a remote DC. For example, service flow 301, which has a service chain including one or more VMs 308 with the functions S 312, P 314 (SGW, PDN-GW) and the network functions V 320, F 318, and T 316, may be routed locally through DC 306 to its end server(s) (not shown). However, service flow 302 is partially processed and egressed through the remote DC 304, while service flow 303 is completely processed and egressed through the remote DC 304. Intuitively, it may seem best to allocate all the VM resources 308 for a particular service flow at the local DC. However, the present principles may be employed to selectively offload processing and egresses for particular service flows 301, 302, 303 through remote DCs 304, 306 in accordance with various embodiments. By offloading particular service flows 301, 302, 303, either for partial or complete processing of functions in their service chains, to remote DCs 304, 306, fine-grained multiplexing of compute resources may be performed across a plurality of remote DCs 304, 306 in accordance with the present principles.

In some embodiments, there may be several reasons why routing certain flows from the egress point of their local DC may not be optimal. These include, for example, (i) Well-known triangle inequality violations in inter-domain routing; (ii) the operator provides the service platforms (e.g., transcoding, analytics etc.) within the network in the context of certain IoT/M2M and Mobile Edge Computing (MEC) based services. Such servers may not be deployed in all the DCs for all the services; and (iii) Unlike large-scale content-providers like Google, that have a highly distributed content delivery network, most content-providers and enterprises have a relatively centralized presence, unlike large-scale content providers (e.g., Google). The servers/CDNs for the traffic of such entities may have better peering with a subset of the operator's DCs in accordance with various embodiments.

In various embodiments, the present principles may be employed to address various inter-DC traffic management challenges that are specific to mobile networks. For example, Wide Area Network (WAN) resource management systems primarily deal with a single constraint (e.g., inter-DC bandwidth), and thus do not provision or account for VM resources in a network. However, the present principles may be employed to, for example, jointly consider two conflicting constraints (e.g., compute and bandwidth) while allocating resources to the flows 301, 302, 103.

Furthermore, conventional WAN systems update computed network paths directly on open-flow switches to allocate an appropriate share for each service across each link. However, the routing plane according to the present principles may be employed to support service chaining by routing the flows across appropriate middlebox VMs in the correct order (e.g., by employing an optimization function/algorithm) at the assigned DC (e.g., DC 304, DC 306) in accordance with various embodiments. Moreover, the constraints and rigidity of LTE-gateways that are part of the data plane are taken into account when enforce network paths in accordance with various embodiments of the present principles.

Figure 4:
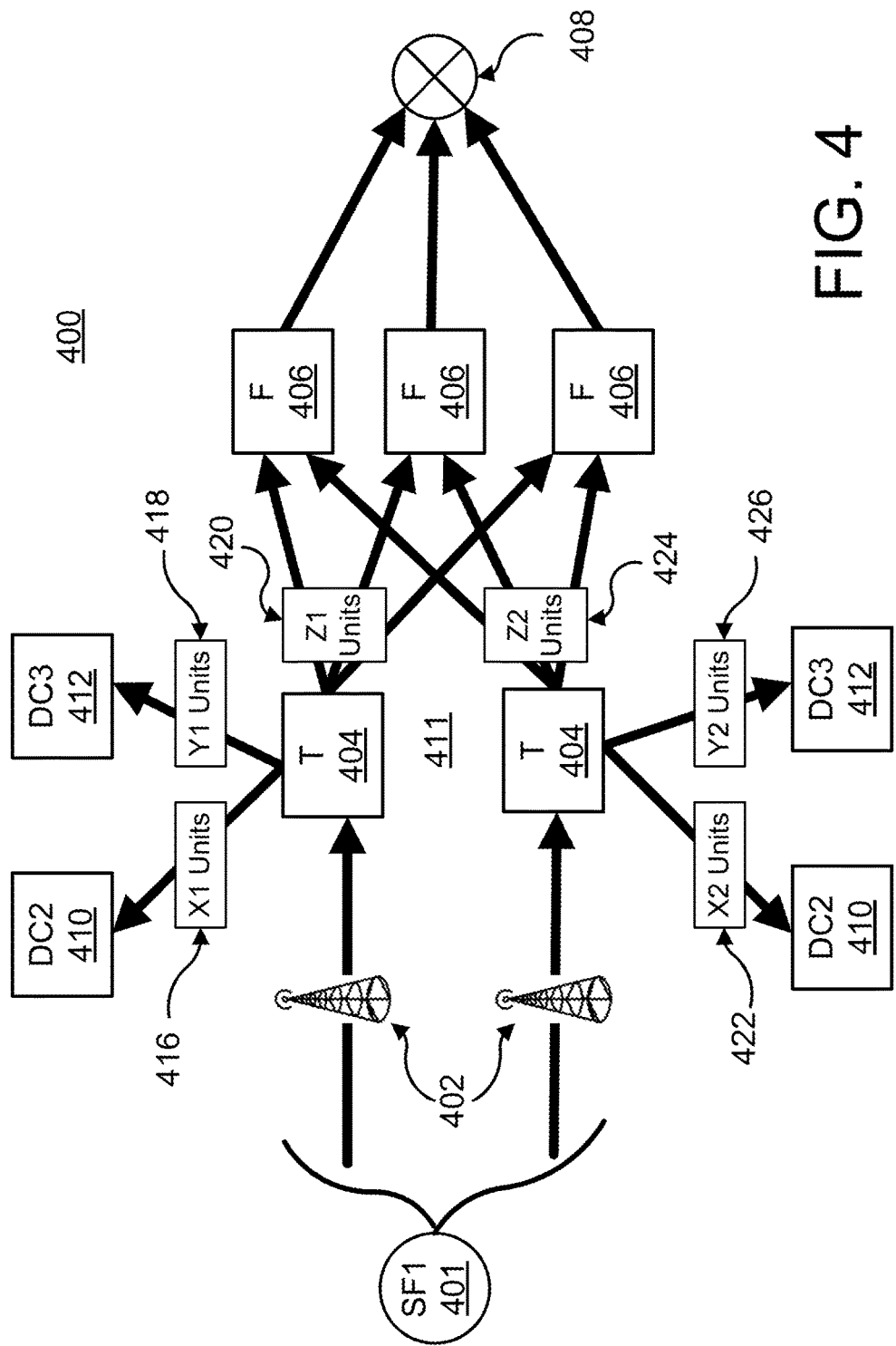
FIG. 4 is a block/flow diagram illustrating an exemplary resource flow allocation for data traffic/network resource management, in accordance with an embodiment of the present principles.

Referring now to FIG. 4, with continued reference to FIG. 3, a block/flow diagram of an exemplary resource flow allocation 400 for data traffic/network resource management is illustratively depicted in accordance with an embodiment of the present principles. In one embodiment, given an expected large scale level of operation, a practically scalable algorithm may be applied for network management in accordance with the present principles. To ensure a practical routing-plane, the present principles may be employed to allocate resources for a service, such that all the flows belonging to that service will be routed along the same path.

For example, in FIG. 3, all the flows belonging to service 302 may be processed by the functions S 312, P 314 in the local DC 306, and by functions V 320, T 316 in remote DC 304. If we relax this constraint to allow fractional splits of a given service, the problem may become computationally tractable, and this solution may be difficult to realize in a practical system. This is because, although all the flows of the same service have to be processed by the same network functions, different flows may get mapped to different VMs of the same function to ensure efficient load balancing in accordance with one embodiment of the present principles.

In some embodiments, to perform proper fractional splits, VMs of the same function (e.g., T 404, F 406) may coordinate with each other in accordance with the present principles. For example, as shown in FIG. 4, 1 unit of traffic from service flow 1 (SF1) 401 may be received from one or more eNodeBs 402, and split at function T 404 with X units 416, 422 to data center 2 (DC2) 410, Y units 418, 426 to DC3 412, and the remaining units (e.g., Z units 420, 424) locally at DC1 411. Data may be transported from DC1 401 using an egress router 408 in accordance with the present principles.

In one embodiment, assuming that there are a plurality of VMs of the function T 404 at DC1 411, the VMs of the function T 404 may coordinate with each other to ensure that the fractions X1 416 and X2 422 add up to X units and fractions Y1 418 and Y2 426 add up to Y units. To ensure a simple and practical system, a greedy approach/method according to the present principles may be employed to provide a solution with integral splits and efficient performance.

In some embodiments, every DC 411, 410, 412 may be configured to dynamically scale the number of VMs of individual network functions (e.g., T 404, F 406) and re-balance the load across active VMs (e.g., 404, 406), and to route selected flows (e.g., 401) to a remote DC 410, 412 at any point in their service chain. In the case of generic middlebox functions, conventional techniques could be leveraged to meet these requirements, since such functions only hold state for active flows. When a new flow is initiated, the network function VM(s) T404, F406 associated for that flow can be (re)-selected to either load balance across the VMs 404, 406, or to offload the flow to VM(s) at a remote DC 410, 412.

However, as described above, conventional LTE-gateway implementations are inflexible to meet the above requirements. The fundamental problem is that UEs are statically assigned to SGWs and PDN-GWs. It is challenging to enable dynamic reassignment of UEs to SGW and PDN-GW entities due to several factors. Firstly, it is important to ensure that the protocols and interfaces of the SGW/PDN-GW with other entities like eNodeBs, MME, Policy Charing and Rules Function (PCRF), etc. are supported. Such a design choice in accordance with the present principles enables incremental deployment alongside existing Evolved Packet Core (EPC) platforms and avoids the need to design, deploy and test novel protocols. Furthermore, eNodeBs 402 may be commoditized and expensive to replace or upgrade.

Secondly, the assignment/reassignment of a UE to a particular SGW/PDN-GW may have to be performed before the application traffic is initiated. Hence, it may not be possible to know the service type or QoS class of the flow that will be initiated by a UE in some embodiments. Furthermore, to support the expected exponential growth of IoT/M2M devices, UEs may be assigned/reassigned in a scalable fashion to effectively redistribute the load across the active VMs (e.g., 404, 406) as VMs are added or removed in accordance with various embodiments of the present principles.

Figure 5B:
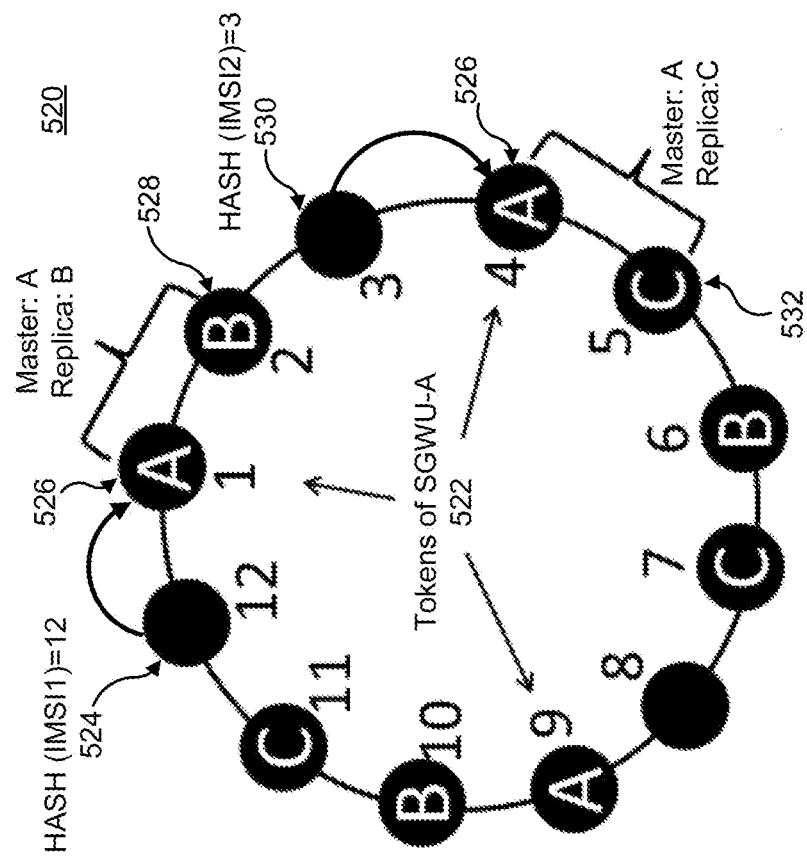
FIG. 5B is a block/flow diagram illustrating an exemplary consistent hash ring for a serving gateway (SGW), in accordance with an embodiment of the present principles.
Figure 5A:
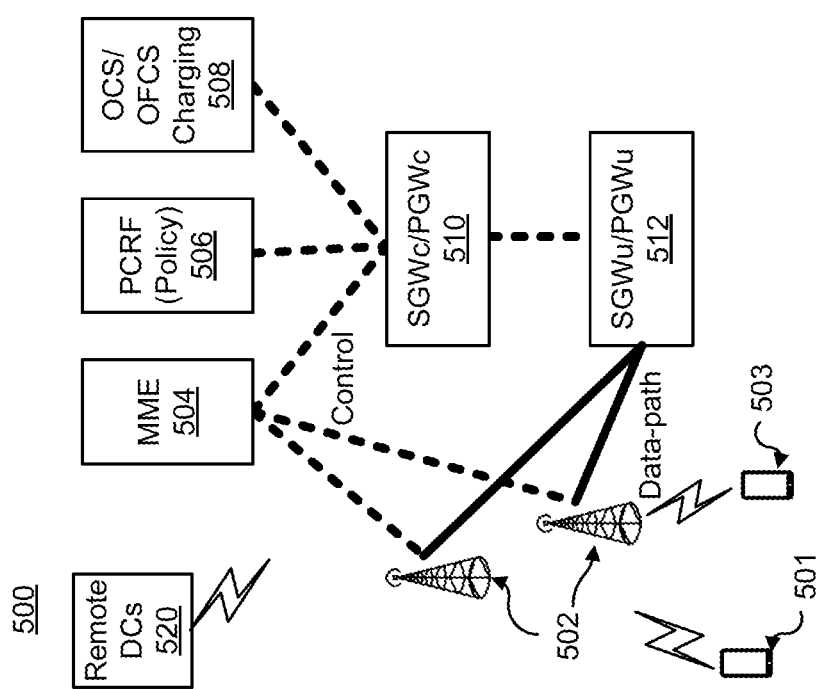
FIG. 5A shows a diagram of a system/method for data traffic/network resource management, accordance with an embodiment of the present principles.

Referring now to FIG. 5A, a diagram of a system/method 500 for data traffic/network resource management is illustratively depicted in accordance with an embodiment of the present principles. In one embodiment, the present principles may be advantageously employed to account for the rigidity in conventional LTE-gateway implementations. In some embodiments, to enable efficient elasticity of LTE-gateway resources (e.g., both within and across DCs), several key design features may be implemented in accordance with the present principles. Firstly, devices 501, 503 (UEs) may be classified into 2 types depending on their service usage: (i) Managed UEs: In this scenario, there is one-to-one mapping between the UE and the service (e.g., the devices are specifically designed to access or provide a particular service). For example, IoT/M2M devices in various industry verticals, (e.g., manufacturing, health, agriculture, surveillance, etc., and enterprise devices) fall into this category; and (ii) Unmanaged UEs: This category is representative of smartphones and similar devices, which are not tied to a particular service. These devices can access several different OTT-based services.

By classifying UEs 501, 503 in these categories, the processing of, for example, SGW and PDN-GW 510, 512 functions of particular flows received from eNodeBs 502 may be offloaded to remote DCs 520 in accordance with the present principles. Such offloading is possible since the service flows belonging to managed UEs are known beforehand and the SGW a PDN-GW 510, 512 may be selected in an appropriate DC in real-time for these UEs 501, 503 in accordance with various embodiments.

In one embodiment, to dynamically assign/reassign the UEs 501, 503 across the gateway resources, standard interfaces and MME 504 based gateway selection may be decoupled in accordance with the present principles. This decoupling may be achieved by architecting the SGW/PDN-GW cluster as two separate logical functions 510, 512. For ease of illustration, FIG. 5A shows a single instance of an SGW/PDN-GW pool that may be deployed at a particular DC in accordance with the present principles. However, it is noted that the present principles may be applied to any number of DCs and/or VMs in accordance with various embodiments.

In one embodiment, the SGWc/PDN-GWc 510 include a control function that maintains the standard interfaces with other entities of the EPC. Using the SDN paradigm, the SGWc/PDN-GWc pool 510 may manage a plurality of SGWu/PDN-GWu VMs 512 and may dynamically reassign UEs 501, 503 across the SGWu/PDN-GWu VMs 512 in accordance with the present principles.

In one embodiment, the SGWu/PDN-GWu 512 may include a data-plane function that performs GTP-based packet forwarding, in addition to a plurality of other functions e.g., charging using Online Charging System (OCS)/Offline Charging System (OPCS) 508). In some embodiments, control messages between the SGWu/PDN-GWu VMs 512 and other entities, such as the MME 504, PCRF 506 (e.g., policy), may be sent via the SGWc/PDN-GWc VM 510. Specifically, when a UE 501, 503 registers with the network, the MME 504 may select a particular SGWc/PDN-GWc 510 for that UE 501, 503. The request for configuring the data bearers for the UE 501, 503 may always be sent to the same SGWc/PDN-GWc 510 by the MME 504 in accordance with the present principles.

In some embodiments, the selection of the SGWu and PDN-GWu VMs 512 are now handled by the SGWc/PDN-GWc 504, and are oblivious to the MME 504. For example, when a UE 501, 503 makes transition from Idle to Active mode, the SGWc 510 may select a particular SGWu VM 512, and may forward its IP-address to the eNodeB 50 via the MME 504. Until the UE 501, 503 goes back to Idle, the eNodeB 5002 may use that IP-address to tunnel the packets of the UE 501, 503. Hence, the SGWu/PDN-GWu 512 assignment for UE 501, 503 can be changed at the granularity of the UE 501, 503 when making transitions between Idle to Active modes in accordance with the present principles.

Referring now to FIG. 59, with continued reference to FIG. 5A, a block/flow diagram of an exemplary consistent hash ring 520 for a serving gateway (SGW) is illustratively depicted in accordance with an embodiment of the present principles. In one embodiment, the present principles may be employed to scale the LTE-gateway resources within and across one or more DCs. In embodiments including scaling within a DC, consistent hashing may be employed to uniformly distribute UEs 501, 503 across the active SGWu/PDN-GWu VMs 512 in accordance with the present principles.

In consistent hashing, the output range of a hash function may be treated as a "fixed circular ring". FIG. 5B shows a simple illustrative instantiation of a SGWu consistent hash-ring with output range [1-12]. Each SGWu VM may be represented by a number of tokens 522 (e.g., random numbers), and the tokens are hashed to the ring so that each VM gets assigned to multiple points on the ring. In the present example, SGWu-A may be assigned to points 1, 4, and 9 522 on the ring 520. A UE may be assigned to a SGWu VM 522 by first hashing its International Mobile Subscriber Identity 524, 530 (IMSI) (e.g., uniquely identifying a UE 501, 503) to yield its position on the ring 520.

In some embodiments, the ring 520 may then be traversed in a clockwise direction to determine the first SGWu VM 522 that has a position larger than the device's (e.g., UEs 501, 503) position on the ring 520. This VM may then become the master SGWu for that device 501, 503. For instance, in FIG. 5B, the SGWu-A 526 is selected as the master for the device with IMSI1 524. When a SGWu VM is added, it is assigned random tokens on the ring 520, and UEs that now fall in the range of the new VM are re-assigned from the neighboring VMs (e.g., SGWu-B 528, SGWu-C 532) in the ring 520. The reassignment of a UE 501, 503 to the new VM (e.g., 528) may be achieved by copying its state from the existing VM (e.g., 526) to the new VM (e.g., 528) in accordance with the present principles.

In various embodiments, assignment of UEs 501, 503 using consistent hashing according to the present principles enables: (i) scalability with a large number (e.g., thousands, millions, etc.) of devices; (ii) SGWu and PDN-GWu VMs (e.g., 522) scaling incrementally in a decentralized manner, as addition or removal of VMs 522 only affects UE 501, 503 re-assignment among neighboring VMs (e.g., 524, 526, 8); and (iii) UE 501, 503 to SGWu/PDN-GWu 512 mappings without requiring SGWc/PDN-GWc VMs 510 to maintain tables for the mapping, thereby improving overall system efficiency including reduced memory usage and processor requirements, and faster lookup speeds in accordance with the present principles.

In some embodiments, in addition to UE 501, 503 assignments, the present principles may be employed to ensure that the traffic load is well-balanced across the SGWu and PDN-GWu VMs 512. To counter overloads, a replica SGWu VM (e.g., 528, 532) may be assigned in addition to a master SGW VM 526 in accordance with the present principles. The replica VM 528, 532 may be the VM adjacent to the master VM 526 in the hash-ring 520. In some embodiments, the state for each UE 501, 503 may be synchronized between the master 526 and replica VMs 528, 532 once the UE makes a transition to Idle mode. This enables the SGWc VM 510 to choose either VMs (e.g., master 526 or replica 528, 532) for the UE 501, 503 the next time it becomes Active, in case, for example, the master VM 526 has an excessively high load.

In some embodiments, while increasing the number of replicas leads to better load balancing, it may contribute to higher memory requirements and synchronization costs to ensure consistency. To strike a balance between these conflicting objectives, a stochastic analysis may be performed to model the impact of replication in consistent hashing on load balancing in accordance with the present principles. As the arrival increases, the overall load on the VMs (e.g., 526) increases when only a single VM 526 is assigned to each UE 501, 503. However, replicating the state of a device for one or more VMs (e.g., 528, 532) in accordance with the present principles drastically reduces the load on the VMs (e.g., 526). Thus, an additional replica SGWu and PDN-GWu VM (e.g., 528, 532) may be selected for each UE 501, 503 to ensure efficient load balancing across the active VMs in accordance with the present principles.

In some embodiments, the assignment of SGWu/PDN-GWu VMs (e.g., 524, 526, 528) is performed before the UE 501, 503 generates traffic, and as such, only flows belonging to unmanaged UEs 501 after the SGWu and PDN-GWu VMs (e.g., 524, 526, 528) in the local DC are offloaded according to the present principles. To enable offloading for managed UEs 503 at any point in their service chains, the SGWc and PDN-GWc pool 510 of each DC may be connected to a subset of SGWu and PDN-GWu VMs in remote DCs 520. For managed UEs 503, in addition to assigning 2 SGWu and PDN-GWu VMs in the local DC, an additional SGWu and PDN-GWu VM ay be assigned in the appropriate remote DC 520.

In some embodiments, all the UEs belonging to the same service flow may be assigned a SGWu and PDN-GWu in the same remote DC 520 in accordance with the present principles. The election of the remote DC 520 for a service flow depends upon the QoS class of that service. For example, In the case of an interactive service flow, the remote DC 520 may be selected such that the end-to-end delay for the traffic of the service flow will be the lowest, and in the case of an elastic service flow, the remote DC 520 may be selected at random in accordance with the present principles.

Figure 6:
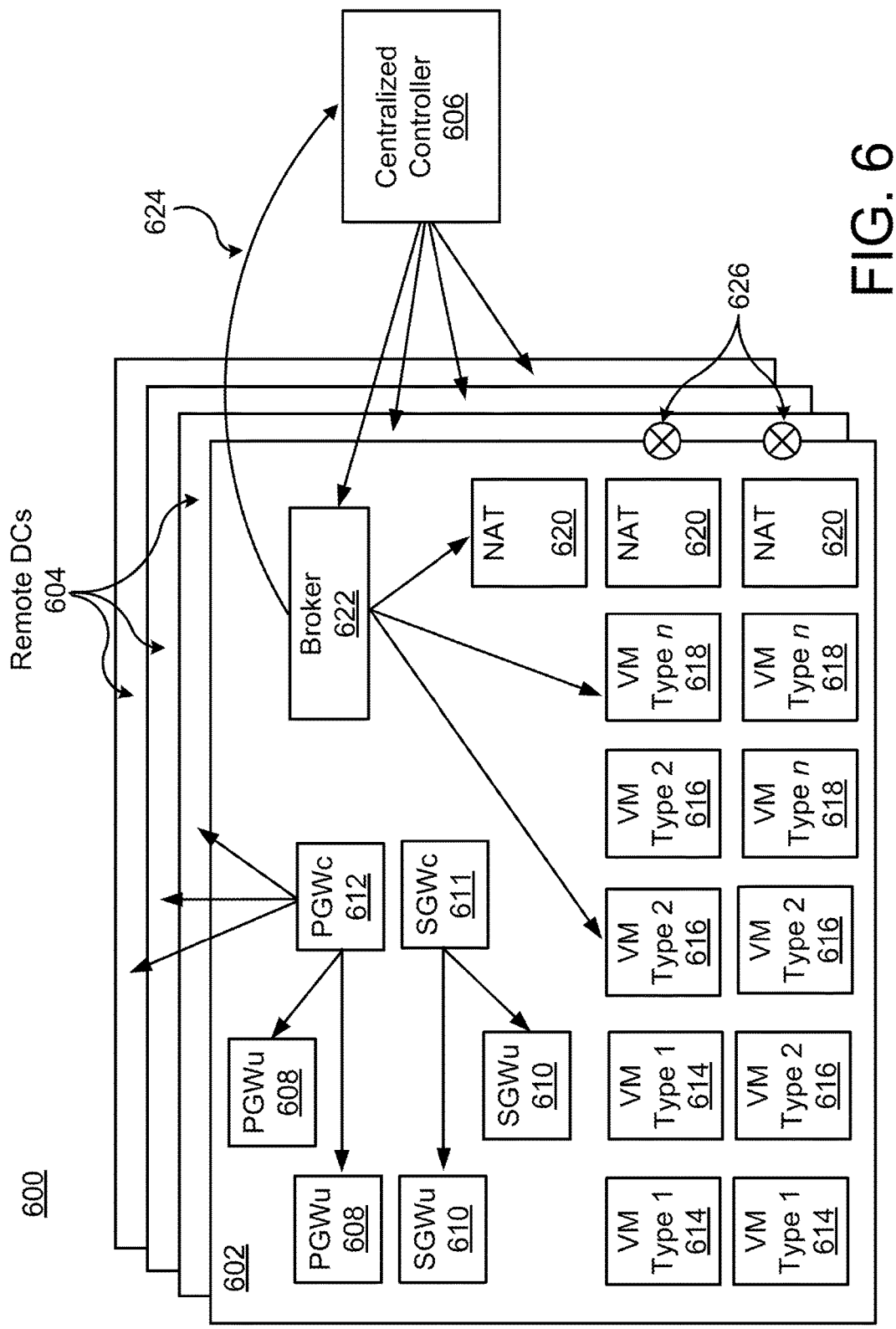
FIG. 6 shows a diagram of a system/method for data traffic/network resource management for multiple data centers, in accordance with an embodiment of the present principles.

Referring now to FIG. 6, a diagram of a system/method 600 for data traffic/network resource management for multiple data centers is illustratively depicted in accordance with an embodiment of the present principles. In one embodiment, a centralized controller 606 may coordinate resource allocation across a pool of DCs 602, 604 (e.g., geographically remote DCs).

In various embodiments, at each epoch (e.g., seconds, minutes, etc.), a broker 622 at each DC 602, 604 may update the controller 606 with traffic demands and VM availability information 624 in accordance with the present principles. In particular, the updates 624 to the controller 606 may include, for example, (i) a total number of VMs 614, 616, 618, 620 available; (ii) estimated current demand of each service obtained from the SGWc 611/PDN-GWc 612; (iii) in the case of service with managed UEs, the location (e.g., remote DC 604) of the SGWu 610/PDN-GWu 608 VMs that are pre-assigned with the UEs of a particular service, and (iv) in the case of interactive flows, the average end-to-end delays when the service is routed through the local DC 602 and each mote DC 604 in the DC pool 602, 604 in accordance with various embodiments of the present principles.

The controller 606 may use the above-described information (e.g., traffic demands and network topology) to compute the allocation for the services in accordance with the present principles. The allocation may specify the data-plane path for each service to determine whether the flows of the service should be egressed at the local DC egress points 626 or a specific remote DC 604, depending upon the location of the VMs allocated to that flow, and if selected for offload, the point in the service chain at which the service should be routed to the remote DC 604.

In some embodiments, in the case of service with managed UEs, the offload point may include any function, including, for example, the SGWu 610/PDN-GWu 608. However, if a service is offloaded at the SGWu 610 or the PDN-GWu 608 VM, the specific remote DC 604 may be pre-determined based on the location of the SGWu 610/PDN-GWu 608 VMs (e.g., 614, 616, 618, 620) that include the state of the UEs of that service in accordance with various embodiments of the present principles.

In some embodiments, in the case of a service with unmanaged UEs, the offload point may be a function that lies after the SGWu 610/PDN-GWu 608 in the service chain (e.g., firewall, NAT, HTTP proxies, video transcoding, etc.). The allocations computed by the controller 606 may be sent to, and enforced by the individual brokers 622. To ensure that the routes of the service are configured appropriately by the brokers 622, a programmable overlay-routing framework (not shown) may be employed according to the present principles. For example, in the case of LTE-gateways, the brokers 622 may enforce the allocation through the SGWc 611/PDN-GWc 612 VMs in accordance with various embodiments of the present principles.

In some embodiments, the central controller 606 may be employed to allocate both the VM and the inter-DC bandwidth resources among one or more services 614, 616, 618, 620 in one or more DCs 602, 604 using Algorithm S1, below, in accordance with the present principles:

---

S1: SCOPE_ Allocation ( )

---

Inputs:
 $t_j^i$: flow demands for service flow i originating at DC j
 S: # of service flows, $\mathcal{D}$: # of DCs, $C_m$: Capacity of MB m
 $V_j$: # of VMs available at DC j, $B_{jk}$: Max. BW available between DCs j and k
 $d_{jk}^i$: End-end delay perceived by the interactive service flow i originating at DC j and egressed through DC k
 $I_{ml}^i$ is an indicator variable that is equal to 1 if the middlebox function m
  lies before the function l in the Service Chain for service i.
Outputs:
 Interactive: $r_j^i$: The DC where the VM resources are allocated for service flow i originating at DC j ---
S1: SCOPE_ Allocation ( )
---

Elastic: $z_{jk}^i$ (l): Fraction of $t_j^i$ assigned to flow i, with VM resources allocated at DC j until MB l and MB l onwards in the service chain are allocated at DC k
1: $V_j^{rem}, B_{jk}^{rem}$ = AllocInteractive($t_j^i$, $d_{jk}^i$, $V_j$, $B_{jk}$)
2: AllocElastic($t_j^i$, $V_j^{rem}$, $B_{jk}^{rem}$)

---

In some embodiments, the allocation by the controller 606 may begin with provisioning the VMs for all the services (e.g., 608, 610, 611, 612, 614, 616, 618, 620) at their local DCs 602, 604, such that the interactive flows meet their demand, while some slack capacity (e.g., min{20% of total VMs, residual VMs}) is provisioned for the elastic services. Starting with this allocation of VMs, the resources for the interactive flows may be reassigned across the DCs (e.g., local 602 and remote 604) to minimize their end-to-end delays. At each step, the system and method according to the present principles respects both the VM constraints at each DC (e.g., local 602 and remote 604) and the inter-DC bandwidth for each DC pair. Once, the interactive flows are allocated resources such that there is no scope for further optimizing the delays, the residual capacity may be allocated to the elastic flows in a in a manner to best utilize the unused VM and bandwidth resources across the network in accordance with various embodiments.

In some embodiments, the controller 606 may employ a Linear Programming/Optimization (LP) formulation for allocating resources to the interactive services, as shown in Algorithm S2, below:

---
S2: Original Formulation for Interactive Service Flows
---

MINIMIZE $\Sigma_i \Sigma_j \Sigma_k \Sigma_l z_{jk}^{il} \cdot (d_{jk}^i / \min_k \{d_{jk}^i\})$; Subject to:

1:
$$\Sigma_i \Sigma_k \Sigma_l \left( z_{jk}^{il} \cdot \Sigma_m \frac{t_j^i \cdot I_{ml}}{C_m} + z_{kj}^{il} \cdot \Sigma_m \frac{t_k^i \cdot I_{lm}}{C_m} \right) \leq V_j^{rem}; \forall j$$

2: $\Sigma_l \Sigma_l (z_{jk}^{il} \cdot t_j^i + z_{kj}^{il} \cdot t_k^i)] \leq B_{jk}^{rem}; \forall j, k$
3: $\Sigma_k \Sigma_l z_{jk}^{il} = 1 \; \forall (i, j)$

---

The above method (S2) may take as input the traffic demands $t_j^i$ and end-to-end delays $d_{jk}^i$ for every service in accordance with the present principles. The delay $d_{jk}^i$ for a service i originating at DC j and egressed at DC k may be computed as the sum of the average delay between the DCs j and k, and the average delay from DC k to the end-server for a particular flow i.

In some embodiments, an objective of the above LP is to minimize the ratio of the actual delay for a flow $d_{jk}^i$ to the minimum delay possible for that flow, aggregated across all flows. Constraints 1 & 2 define the VM resource constraint at each DC and the inter-DC bandwidth constraints $B_{jk}$, respectively. The formulation for the elastic services would be similar, except with the objective of maximizing the throughput. The output of the LP, $z_{jk}^{il}$ gives the fraction of $t_j^i$ that will be allocated to the service i originating at DC j, such that the VM resources up until the middlebox function l may be allocated at DC j, and the functions beyond l in the service chain of i will be allocated at DC k in accordance with various embodiments. However, the LP may lead to allocations that are split across multiple DCs or at multiple points in the service chain for a particular service. In the case that $z_{jk}^{il} > 0$ for more than two values of l or k for the same service i, the allocation of the service may be either split at multiple functions, across multiple DCs, or both, in accordance with the present principles.

In some embodiments, resources may be assigned to provide a practical system design for the routing plane. For example, the present principles may be employed to assign resources such that (i) all the traffic of a service follows the same routing-path; and (ii) once offloaded to a remote DC at any point in its service chain, the service is not re-routed to another DC and is egressed at that DC. Allocating resources in this way ensures that the present principles does not require a split of the traffic of a service across DCs along any path in its service chain.

Hence, in accordance with various embodiments, a service may be either (i) allocated all the resources in the local DC; (ii) partially allocated resources at the local DC up to a middlebox function, with the remaining resources allocated at a remote DC, or (iii) allocated all the resources at a remote DC in accordance with the present principles. Although the method S2 can be forced to ensure binary values to $z_{jk}^{il}$ to satisfy above-described design choices and effectively minimize delays, it may result in a high number of VMs instantiated at the individual DCs in some embodiments.

The high number VMs may be a result of sub-optimal packing of the flows into VMs, an option of splitting the allocation of interactive service across DCs at arbitrary middlebox functions in their service chain may be omitted in various embodiments. Instead, the present principles may be applied to negate this loss of efficiency by better packing the resources for the elastic services in accordance with various embodiments. In particular, resources may be allocated to the elastic services such that the allocation of a service may be split across DCs at any arbitrary middlebox function in its service chain (e.g., using an LP formulation). However, the LP may give results such that the allocation of certain elastic flows are fractionally split across multiple DCs in some embodiments, and since elastic flows are not requirements, the LP may be transformed into an Integer LP, therefore making it intractably complex.

To solve the above challenge, the allocation procedure at the controller 606 may be simplified for the interactive service by focusing on minimizing delays in accordance with the present principles. In some embodiments, an efficient greedy algorithm that either allocates all the resources for an interactive service at the local DC, or allocates all the resources at are remote DC may be employed to meet traffic demands. Although, this method may be delay sensitive and the traffic demands may not always be fully met, the present principles may be employed to approximate the resulting allocations for the elastic flows in accordance with various embodiments.

In some embodiments, the controller 606 may employ a light-weight, but efficient greedy algorithm for function allocation for interactive services, as shown in Algorithm S3, below:

---
S3: Function AlloInteractive($t_j^i$, $d_{jk}^i$, $V_j$, $B_{jk}$)
---

1:
$$v_j^i = \Sigma_l \frac{t_j^i}{C_l}, \forall (i, j)$$

2: $\pi \leftarrow \{\mathcal{D}\}$
3: % Outer Loop
4: for $d \in [1 : |\mathcal{D}|]$ do
5: $\quad V_d^T = V_d; B_{dk}^T = B_{dk} \; \forall k$
6: $\quad$ % Inner Loop: Within every DC that is unassigned
7: $\quad$ for $j \in \pi$ do S3: Function AllocInteractive($t_j^i$, $d_{jk}^i$, $V_j$, $B_{jk}$)

| | |
|---|---|
| 8: | $A_j \leftarrow \emptyset$, $U_j = 0$ |
| 9: | for i ∈ S do |
| 10: | for k ∈ [1 : \|$\mathcal{D}$\|] do |
| 11: | $U_{jk}^i = d_{jk}^i - \min_k \{d_{jk}^i\}$ |
| 12: | end for |
| 13: | $i^*, k^* = \arg\min_{(i,k)\ s.t.\ i \notin A_j} \{U_{jk}^i\}$ |
| 14: | $U_j = U_j + U_{jk^*}^{i^*}$; $A_j \leftarrow A_j \cup i^*$ |
| 15: | $V_{k^*}^T = V_{k^*}^T - v_j^{i^*}$; $B_{jk^*}^T = B_{jk^*}^T - t_j^{i^*}$ |
| 16: | $r_j^i = k^*$ |
| 17: | end for |
| 18: | end for |
| 19: | $j^* \leftarrow \arg\min_j U_j$ |
| 20: | $\pi \leftarrow \pi - j^*$ |
| 21: | % Update the resources used by the service flows of DC j |
| 22: | for i ∈ S do |
| 23: | $k = 0\ r_{j^*}^i$ |
| 24: | $V_k = V_k - v_{j^*}^i$; $B_{j^*k} = B_{j^*k} - t_{j^*}^i$ |
| 25: | end for |
| 26: | end for |

In some embodiments, the controller 606 may receive the traffic demands $t_j^i$ and end-to-end delays $d_{jk}^i$ for every service flow and available VM resources $V_j$ and inter-DC bandwidth $B_{jk}$ 624 as input from a broker 622 for every DC 602, 604. The method S3 may allocate resources in two steps in accordance with the present principles. For example, in the outer loop (Steps 5-25), the resources may be allocated at the DC level (e.g., resources are allocated to all the services that originate from a particular DC). At every step, the resources may be allocated to the DC that gives the maximum utility (Step 19). The utility for a DC Uj may be the aggregate of the utilities of the individual service that originate at that DC. The inner loop (Steps 8-17) may allocate resources to the service of each unallocated DC, and may be represented by the set $\pi$.

In some embodiments, at every step for a particular DC 602, 604, the service with the highest utility may be selected for resource allocation (Step 13). The flow utilities $U_{jk}^i$ for a service i that originates at DC j may be calculated based on the remote DC k that the flow is routed to in accordance with the present principles. The utility $U_{jk}^i$ may be defined as the difference between the delay perceived by the flow i when it is egressed at DC k and the minimum delay that is possible for flow i among all options, including egressing through the local DC 602 (Step 11). At this stage, the service may not actually be assigned resources, as the previous steps may simply be used for computing the aggregate utility (Step 14) in accordance with the present principles.

After every DC in the set $\pi$ is visited, the DC with the highest utility may be selected (Step 19), and the allocation for the flows of that DC may be committed by accounting for their VM and inter-DC bandwidth usage (Step 24) in accordance with various embodiments. The output may be stored as $r_j^i$, that specifies the index of the DC where the service i originating at DC j may be processed and egressed in accordance with the present principles.

In some embodiments, once the interactive flows are satisfied, as described above, the controller 606 may allocate for elastic services using the LP in Algorithm S4, below:

S4: Formulation AllocElastic($t_j^i$, $V_j^{rem}$, $B_{jk}^{rem}$)

MAXIMIZE $\lambda$; Subject to:

1: $\Sigma_k \Sigma_l z_{jk}^{il} \geq \lambda$; $\forall (i, j)$

2: $\Sigma_i \Sigma_k \Sigma_l \left( z_{jk}^{il} \cdot \Sigma_m \frac{t_j^i \cdot I_{ml}^i}{C_m} + z_{kj}^{il} \cdot \Sigma_m \frac{t_k^i \cdot I_{lm}^i}{C_m} \right) \leq V_j^{rem}$; $\forall j$ 3: $\Sigma_i \Sigma_l (z_{jk}^{il} \cdot t_j^i + z_{kj}^{il} \cdot t_k^i)] \leq B_{jk}^{rem}$; $\forall j, k$ 4: $\Sigma_k \Sigma_l z_{jk}^{il} \leq 1\ \forall (i, j)$ A maximum fraction($\lambda$) of $t_j^i$ may be computed for each service such that ($\lambda \cdot t_j^i$) may be allocated to the flow. The $t_j^i$ for an elastic flow can either be defined as the estimated traffic demand or the maximum data rate allocation according to Service Level Agreements (SLAs) with the service provider.

In some embodiments, the output of the LP (method S4): $z_{jk}^{il}$ gives the fraction of $t_j^i$ that may be allocated to the service i originating at DC j, such that the VM resources until the middlebox function may be allocated at DC j, and the functions beyond 1 in the service chain of i may be allocated at DC k in accordance with the present principles. The sum of the fractional allocations $z_{jk}^{il}$ may be at least $\lambda$ for a particular flow (Constraint 1). Constraints 2 and 3 may define the VM resource constraints at each DC 602, 604, and the bandwidth constraint between each pair of DCs, respectively.

In some embodiments, to conform with the routing plane implementation according to the present principles, in a case where the allocations for a service are split across multiple DCs 602, 604 (or at multiple points in the service chain), the algorithm S4 may simply select the allocation for a flow which has the fraction with the highest value. If needed, the smaller fractions of such flows may be reassigned to other flows that can potentially use it. For example, since the optimization could return fractional allocations in different DCs, the smaller fractions returned by the method can be given to other service flows in that DC, who have traffic demands that can use up that fractional allocation. However, in the vast majority of testing simulations runs using the system and method according to the present principles, we do not see more than 2-3 among 500 service flows receiving such split allocation.

In some embodiments, the controller 606 may be employed to configure the data path in accordance with the present principles. Once the controller 606 computes the allocations for an epoch, the broker 622 at each DC configures the appropriate number of VMs per middlebox function and the routing-plane for each service. In the case of the EPC gateways, the broker 622 configures the SGWc/PDN-GWc VMs. Firstly, SGWc/PDN-GWc VMs provision the allocated number of SGWu/PDN-GWu VMs. Secondly, if a service flow has to be offloaded to a remote DC for processing of the SGW & PDN-GW functions, the SGWc/PDN-GWc configures itself to select the SGWu/PDN-GWu VMs at the appropriate remote DC for the UEs belonging to that service flow in accordance with the present principles. The next time a UE belonging to that service flow becomes active, the SGWc/PDN-GWc selects a SGWu/PDN-GWu VM at the remote DC 604. For UEs that belong to service flows that do not need to be offloaded to remote DCs in an epoch, the SGWc/PDN-GWc selects the master or replica SGWu/PDN-GWu VM based on instantaneous load in accordance with the present principles. Note that offloading of the SGW & PDN-GW functions to remote DC's 604 is limited to the service with managed UEs in accordance with various embodiments of the present principles.

Figure 7:
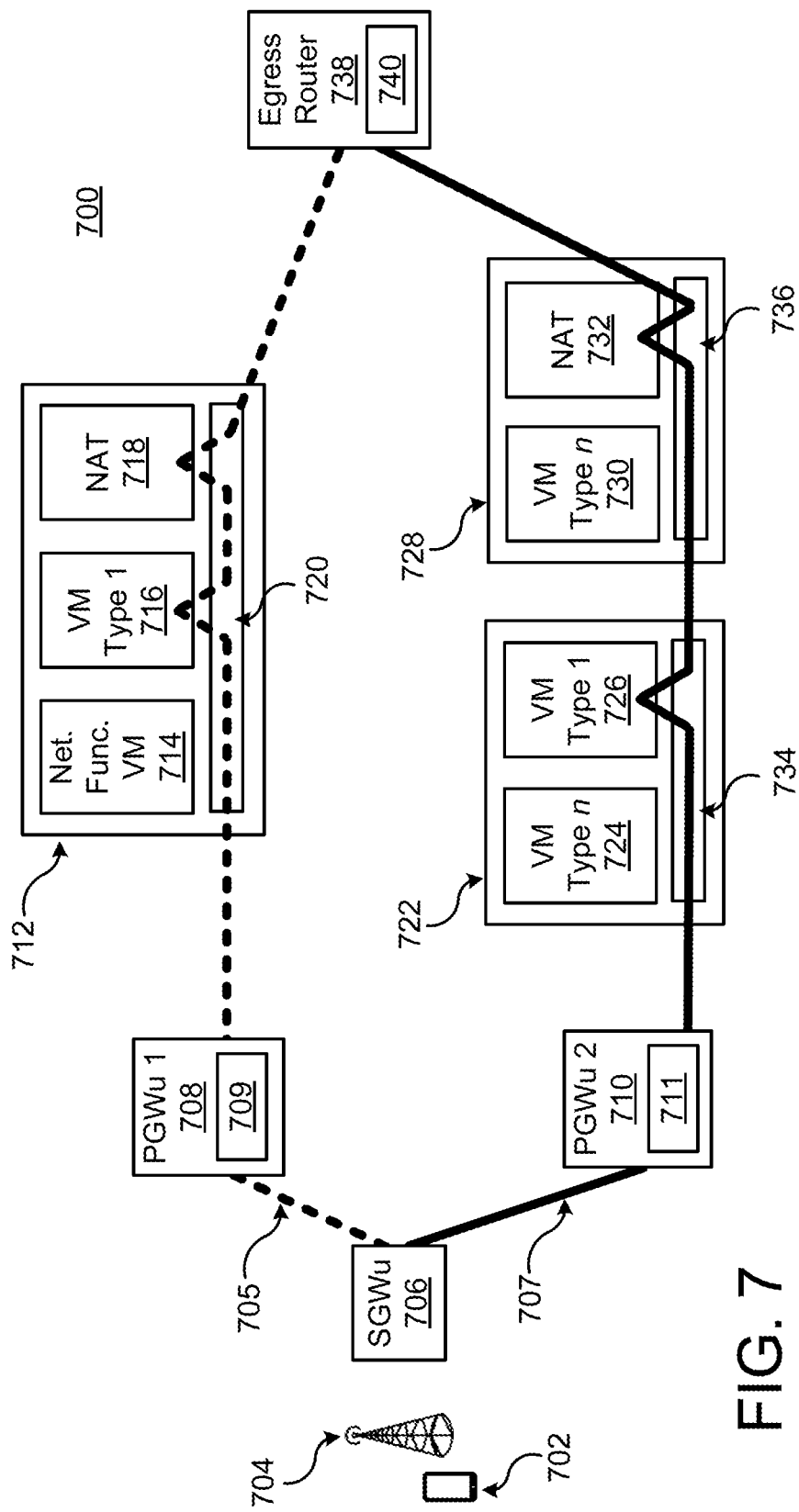
FIG. 7 is a block/flow diagram illustrating an exemplary service chain routing during data traffic/network resource management, in accordance with an embodiment of the present principles.

Referring now to FIG. 7, with continued reference to FIG. 6, a block/flow diagram of exemplary service chain routing 700 during data traffic/network resource management is illustratively depicted in accordance with an embodiment of the present principles. To configure the routing beyond the PDN-GWu VMs, an overlay-routing framework may be employed to configure the network-paths for each of one or more services (e.g., 714, 716, 718, 721, 726, 730, 732). This ensures (i) deployments are independent of the network hardware, even in public clouds, and (ii) ease of scaling the network functionality when physical servers are added, since the framework is well-distributed.

In some embodiments, the supported offload options for the different types of service may be situation dependent. For example, in the case of interactive and elastic service with unmanaged UEs 702, the SGWu 706 and the PDN-GWu 708, 710 VMs may be allocated at the local DC. For elastic flows received from an eNodeB 704 with managed UEs 702, either the SGWu 706 or the PDN-GWu 708, 710 VMs, or both could be offloaded to a remote DC 604. However, in the case of interactive flows with managed UEs 702 that are offloaded to a remote DC 604, both the SGWu 706 and the PDN-GWu 708, 710 VMs may have to be offloaded since the system and method according to the present principles does not split the allocation at arbitrary functions for interactive services.

In some embodiments, Overlay routing is achieved using labels, so that the complex step of service classification using a classifier 709, 711 at the PDN-GWu 708, 710 is performed only once at the edge nodes, while the intermediate nodes perform label-switching in accordance with the present principles. As shown in FIG. 7, the PDN-GWu 708, 710 and egress-router 738 VMs perform classification of the uplink and downlink traffic, respectively, using a classifier 709, 711, 740. In the intermediate nodes, the routing or label-switching is agnostic to the individual VMs 714, 716, 718, 724, 726, 730, 732 of the middlebox functions. Each physical server 712, 722, 728 may be equipped with a shim-layer 720, 734, 736 that performs both the VM selection and next-hop routing in accordance with various embodiments of the present principles.

When a PDN-GWu 708, 710 or an egress router 738 receive a packet, the 5-tuple is used to classify the flow into the appropriate service based on information stored in their database. The next step may be to select a VM for the next function (e.g., network function 714, NAT function 718, etc.) in the chain of the service. While there are multiple ways to select a VM among the active VMs for a function, including hashing, the present principles may be employed to randomly select a VM for a flow to ensure simplicity. Once the VM (e.g., 716, 718/726, 730) is selected for a flow (e.g., 705/707), an entry is made to ensure the subsequent packets of the flow can be routed appropriately.

In some embodiments, the packet is then encapsulated with an outer header containing the IP-address of the physical server (e.g., 712) that hosts the selected VM (e.g., 716, 718) in accordance with the present principles. Before forwarding the packet, the PDN-GW 708, 711 or the egress router 738 may add a label with the following information:
(i) service-flow-Id: Id of the flow,
(ii) curr-VM-Id: Id of the VM that will process the packet,
(iii) last-fn-Id: Id of the function in the service chain, after which the packet may be forwarded to a remote DC for further processing, and/or
(iv) remote-DC-Id: Id of the remote DC where the packet may be forwarded after local processing.

In some embodiments, when the shim layer module 720 receives a packet from an interface, it strips the outer header and forwards the packet to the VM based on the curr-VM-Id. When the shim layer module 720 receives the packet back from the VM 716, it performs either f the following: (i) if the packet needs further processing in the same DC, it is forwarded to the appropriate physical server. The header is re-attached to the packet after curr-VM-Id is updated with the Id of the selected VM that will process the packet. Similar to the edge nodes, the shim layer module 720 selects a VM 718 randomly among the active VMs for the next function in the service chain of the flow.

Once a VM is selected, an entry is stored in the shim layer module 720 to ensure that subsequent packets of the flow are routed to the same VM 716. (ii) if the packet needs further processing in a remote DC (e.g., if the VM with Id:curr-VM-Id belongs to the function with Id: last-fn-Id), it is forwarded to the default gateway for that DC (remote-DC-Id). The headers are reattached to the packet after the field:curr-VM-Id is updated to represent the index of the function rather than a particular VM. The specific VM for the next function is chosen by the ingress router at the remote DC. This ensures that the VM-level information does not have to be shared across DCs.

In conventional networks, the PDN-GW is managed independent from the service chain routing for the other generic middlebox functions. However, the choice of adding the PDN-GWu 708, 710 in the routing overcomes various implementation challenges, as the IP address of a UE is assigned by the PDN-GWu 708, 710 and remains until the UE is registered or moves to a different service area. Hence, changing the PDN-GWu 708, 710 VM assignment requires the IP address of the UE to be re-assigned, involving considerable control overhead with messages to the UE over the wireless link in conventional systems. However, as the PDN-GW 708, 710 VMs are part of the overlay network in the present system and method, switching the PDN-GWu 708, 710 VM for a UE 702 ensures that its flows 705, 707 can be routed without changing its IP address in accordance with various embodiments.

For example, as shown in FIG. 7, the PDN-GWu 708, 710 is changed for the UE 702 due to overload in the original PDN-GWu 708, 710 VM. Before the switch, a particular service flow 705 (dashed) for the UE 702 was routed through the Type 1 (e.g., firewall) 716 and NAT 718 VMs. After the switch, the service flow 707 (solid) for the UE 702 is routed through a new set of Type 1 (e.g., firewall) 726 and NAT 732 VMs, without changing the UEs 702 IP address. Since the overlay routes may be dynamically created as new flows are initiated, the same IP address of a UE 702 can be routed through the current selection of PDN-GWu 708, 710 VM for that UE 702 in accordance with various embodiments of the present principles.

A prototype implementation of the system and method according to the present principles (hereinafter "SCOPE") has been constructed for testing, and includes system components as shown in FIGS. 6 and 7. The implementation of the EPC gateways was done using OpenEPC, which is a LTE Release 9 compatible EPC network consisting of standard LTE EPC entities and an eNodeB emulator. We modify the SGW and PDN-GW implementations the open EPC to implement the SGWc, PDN-GWc, SGWu and PDN-GWu. We implement the Consistent Hashing functionality into these entities using the MD5 hash libraries. In the prototype, a few bytes in the IMSI are reserved for the service flow id for SGWc/PDN-GWc to reap service flows to UEs, and the routing framework (e.g., SCOPEm) may be implemented using, for example, a Click modular router.

In some embodiments, the original GRE tunnel module in Click may be modified according to various embodiments of the present principles to build the functionalities specific to SCOPEm. SCOPEm constructs and maintains a table to store the next and previous hop information for each flown so that all packets corresponding to a flow are routed via the same set of VMs. SCOPEm also may perform decapsulation and encapsulation of the headers while passing packets to and from the VMs. To implement the classifiers at the edge nodes, a Click module may be included in the PDN-GWu 708, 710 and egress 738 routers. The classifiers 709, 711, 740 may encapsulate each data packet with a GRE header and may insert the label to each packet with the relevant information in the key field of the GRE header.

In some embodiments, we use combinations of various user level proxies (e.g., iprelay, Vaurien TCP Proxy Squid HTTP proxy, etc.) as network functions in the prototype system. The central controller 606 and broker 622 may be implemented as user-space applications in accordance with the present principles. A GNU Linear Programming Kit/linear programming solver (GLPK) may be employed to solve the resource allocation problem for the interactive flows and a resource allocation algorithm (e.g. S1) may be implemented for the elastic flows. The controller 606 may encode the allocation information as JSON format and may send it to the brokers 622. The broker 622 at a particular DC may configure both (i) SGWc/PDN-GWc and (ii) appropriate routing rules in the SCOPEm shim layer in accordance with various embodiments of the present principles.

Figure 8:
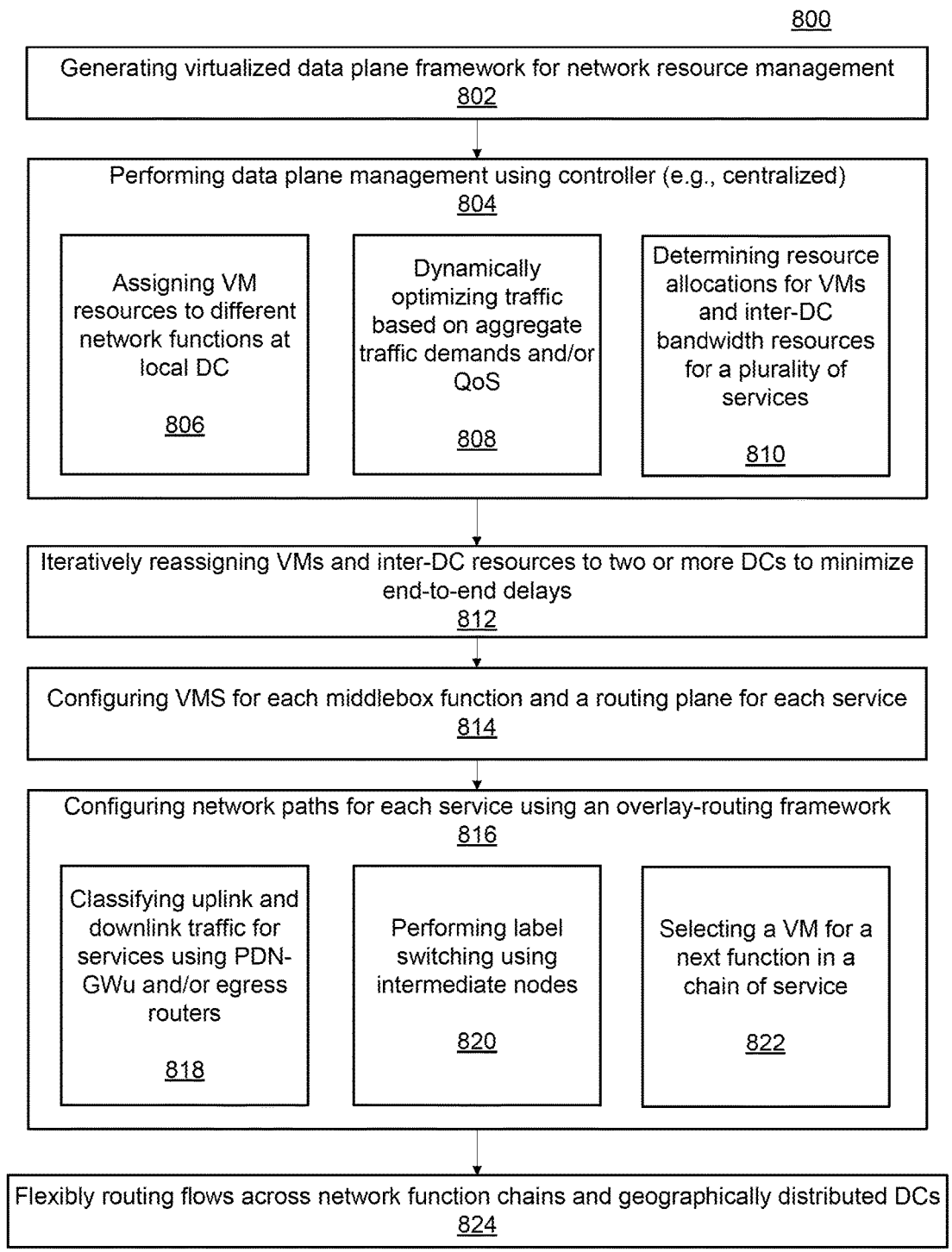
FIG. 8 is a block/flow diagram of a method for data traffic/network resource management for multiple data centers, in accordance with an embodiment of the present principles.

Referring now to FIG. 8, a block/flow diagram of a method 800 for data traffic/network resource management for multiple data centers using a virtualized data plane framework is illustratively depicted in accordance with an embodiment of the present principles. In one embodiment, a virtualized data plane framework (e.g., LTE/EPC framework) may be generated for data traffic/network resource management in block 802. In block 804, data plane management may be performed using a central controller. The data plane management in block 804 may further include assigning VM resources to different network functions at a local DC in block 806, dynamically optimizing traffic based on aggregate traffic demands and/or QoS requirements in block 808, and determining resource allocations for VMs and inter-DC bandwidth resources for a plurality of services in block 810 in accordance with various embodiments of the present principles.

In block 812, VMs and inter-DC resources may be iteratively reassigned to two or more DCs to minimize end-to-end delays until a threshold is reached. In block 814, a sufficient number of VMS per middlebox function and a routing plane for each service may be configured based on the determined resource allocation. In block 816, network paths for each service may be configured using an overlay-routing framework. The configuring in block 816 may further include classifying uplink and downlink traffic for services using PDN-GWu and/or egress routers in block 818, performing label-switching using intermediate nodes in block 820, and selecting a VM for a next function in a chain of service in block 822. In block 824, flows may be flexibly routed across network function chains and multiple geographically distributed DCs based on the resource allocation and configured network paths in accordance with various embodiments of the present principles.

Figure 9:
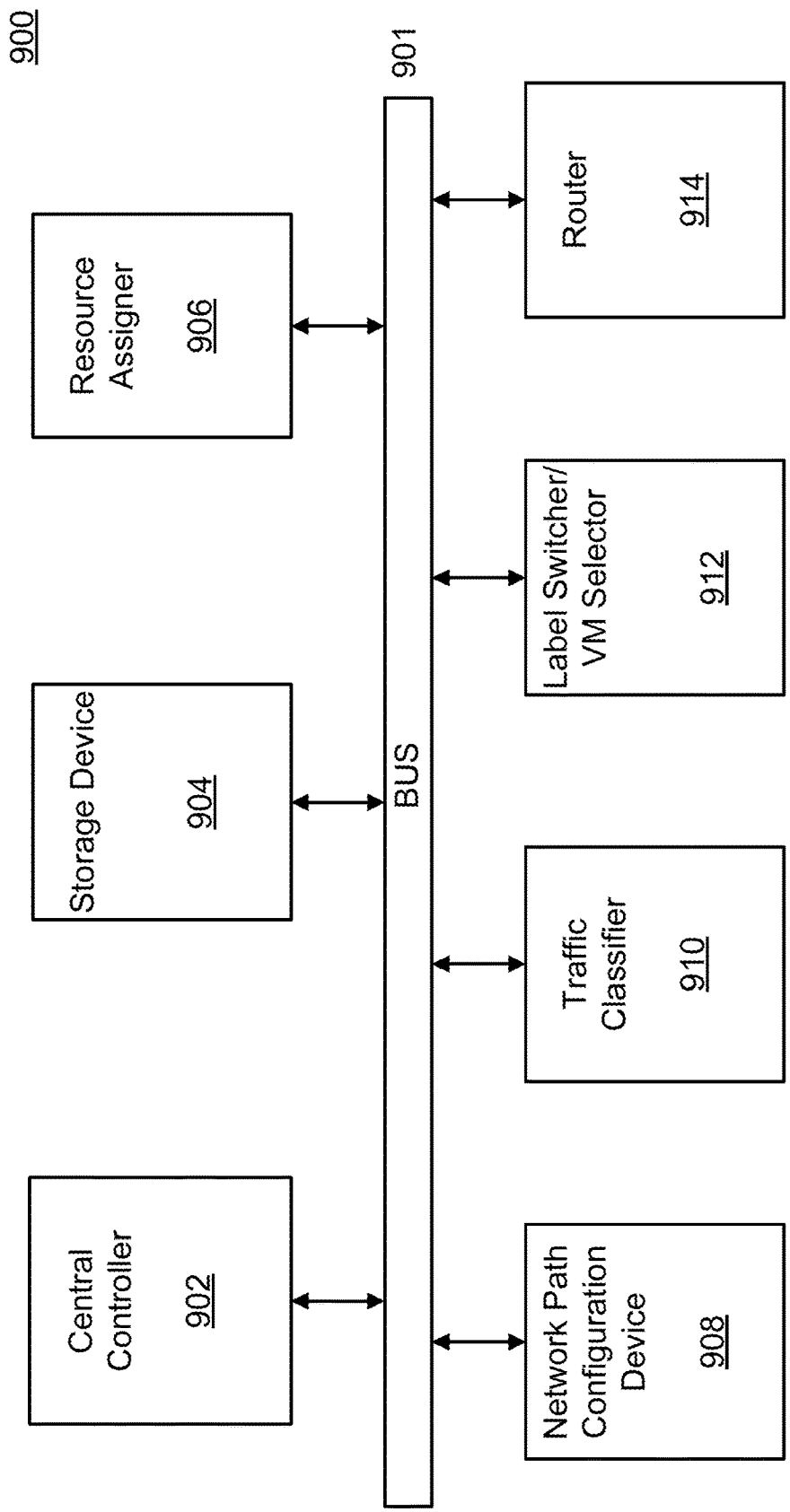
FIG. 9 is a block/flow diagram of a system for data traffic/network resource management for multiple data centers, in accordance with an embodiment of the present principles.

Referring now to FIG. 9, a block/flow diagram of a system 900 for data traffic/network resource management for multiple data centers is illustratively depicted in accordance with the present principles.

While many aspects of system 900 are described in singular form for the sakes of illustration and clarity, the same can be applied to multiples ones of the items mentioned with respect to the description of system 900. For example, while a single network path configuration device 908 is described, more than one network path configuration device 908 can be used in accordance with the teachings of the present principles, while maintaining the spirit of the present principles. Moreover, it is appreciated that the network path configuration device 908 is but one aspect involved with system 900 than can be extended to plural form while maintaining the spirit of the present principles.

The system 900 can include a bus 901, a centralized controller 902, a resource assigner 906, a network path configuration device 908, a traffic classifier 910, a label switcher/VM selector 912, and a router 914, in accordance with various embodiments of the present principles. A storage device 904 (e.g., non-transitory computer readable medium may be employed to store, for example, determined flow allocations, configuration paths, labels, VMs, etc, and the controller 902 (e.g., local or remote) may be employed to provide commands to the system 900 in accordance with various embodiments of the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer implemented method for managing network resources, comprising:
   managing a generated virtualized data plane network using a central controller, the managing further comprising:
      assigning virtual machine (VM) resources to two or more different network functions at a local data center;
      dynamically optimizing traffic based on at least one of aggregate traffic demands and quality of service (QoS) goals; and
      determining resource allocations and inter-data center (DC) bandwidth resources for VMs for a plurality of services;
   configuring VMs for each middlebox function and a routing plane for each service based on the determined resource allocation, said middlebox function including transforming, inspecting, filtering and manipulating traffic for purposes other than packet forwarding; and
   routing flows based on the resource allocation and one or more configured network paths using an overlay-routing framework.

2. The computer-implemented method of claim 1, wherein the flows are routed across network function chains and a plurality of geographically distributed DCs.

3. The computer-implemented method of claim 1, further comprising:
   iteratively reassigning VMS and inter-DC resources across two of more DCs to minimize end-to-end delays until a threshold is reached.

4. The computer-implemented method of claim 1, wherein the network paths are configured by:
   classifying uplink and downlink traffic for one of more services using one or more routers;
   performing label-switching using intermediate nodes; and
   selecting a VM for a next function in a chain of service.

5. The computer-implemented method of claim 3, wherein the two or more DCs are geographically remote DCs.

6. The computer-implemented method of claim 1, wherein the controller is periodically updated with at least one of a total number of VMs available, an estimated current demand of each service obtained from a Serving Gateway (SGW)/Packet Data Network Gateway (PDN-GW), a location of VMs for each service on one or more remote DCs, and average end-to-end delays when each service is routed through a local DC and each of a plurality of remote DCs in a DC pool.

7. The computer-implemented method of claim 1, further comprising leveraging consistent hashing to uniformly distribute one or more UEs across active Serving Gateway (SGW)/Packet Data Network Gateway (PDN-GW) VMs, wherein the SGW and PDN-GW are included in an Evolved Packet Core (EPC).

8. The computer-implemented method of claim 7, wherein each SGW VM is represented by a number of tokens, the tokens being hashed to a hash ring with each VM being assigned to multiple points on the ring.

9. The computer-implemented method of claim 7, wherein the one or more UEs are reassigned to new VMs by copying a state from an existing VM to a new VM to scale as a total number of UEs increases.

* * * * *